US012656200B2

(12) United States Patent
McNeil et al.

(10) Patent No.: US 12,656,200 B2
(45) Date of Patent: Jun. 16, 2026

(54) SYSTEM FOR READING PRESSURE OF A PRESSURE SENSOR AND METHOD THEREFOR

(71) Applicant: STMicroelectronics International N.V., Geneva (CH)

(72) Inventors: Andrew C. McNeil, Chandler, AZ (US); Chad Dawson, Queen Creek, AZ (US); Matthew Wayne Muddiman, Gilbert, AZ (US)

(73) Assignee: STMicroelectronics International N.V., Geneva (CH)

( * ) Notice: Subject to any disclaimer, the term of this patent is extended or adjusted under 35 U.S.C. 154(b) by 192 days.

(21) Appl. No.: 18/063,388

(22) Filed: Dec. 8, 2022

(65) Prior Publication Data

US 2024/0192072 A1 Jun. 13, 2024

(51) Int. Cl.
*G01L 17/00* (2006.01)
*B60C 23/04* (2006.01)
*G01L 19/02* (2006.01)

(52) U.S. Cl.
CPC .......... *G01L 17/00* (2013.01); *B60C 23/0474* (2013.01); *B60C 23/0488* (2013.01); *G01L 19/02* (2013.01)

(58) Field of Classification Search
CPC ....... G01L 17/00; G01L 19/02; G01L 27/005; B60C 23/0474; B60C 23/0488
See application file for complete search history.

(56) References Cited

U.S. PATENT DOCUMENTS 2,808,545 A * 10/1957 Hirtreiter ................ G01L 19/02
73/718
3,962,921 A * 6/1976 Lips ...................... G01L 9/0075
361/285

(Continued)

FOREIGN PATENT DOCUMENTS

CN 111060147 A * 4/2020 ............. B64C 17/00
EP 1659386 A1 * 5/2006 ................ G01P 1/02

(Continued)

OTHER PUBLICATIONS

Szczerba, Zygmunt et al; "Sensitivity of Piezoresistive Pressure Sensors to Acceleration"; Energies 2022; 15 pages (Jan. 11, 2022).

*Primary Examiner* — Jill E Culler

(74) *Attorney, Agent, or Firm* — Seed Intellectual Property Law Group LLP

(57) ABSTRACT

A method for reading pressure may include reading, by a first device, an acceleration of a pressure sensor, wherein the pressure sensor is encapsulated in a medium, and wherein the acceleration alters a reading of the pressure sensor and reading, by a second device, a pressure reading from the pressure sensor. If an output criteria is met, an adjusted pressure reading is produced. A system for reading pressure includes a first device coupled to the pressure sensor and configured to read an acceleration of the pressure sensor. A second device may be configured to read a pressure from the pressure sensor wherein, if an output criteria is met, to adjust the measured pressure of the pressure sensor, based on the measured acceleration, to produce an adjusted pressure reading. An output device is configured to receive an output of the second device and to output an output pressure reading.

20 Claims, 4 Drawing Sheets

(56)        References Cited

U.S. PATENT DOCUMENTS

| 6,105,434 | A | 8/2000 | Engeler | |
| 10,935,565 | B2 | 3/2021 | Steiner | |
| 11,359,985 | B2 * | 6/2022 | Ned | G01L 19/02 |
| 2003/0033884 | A1 * | 2/2003 | Beekhuizen | G01L 19/02 |
| | | | | 73/718 |
| 2005/0000293 | A1 | 1/2005 | Kandler | |
| 2006/0070424 | A1 * | 4/2006 | Saari | G01L 1/26 |
| | | | | 73/1.08 |

FOREIGN PATENT DOCUMENTS

| KR | 101787206 | B1 | 11/2017 |
| WO | WO-2009101566 | A1 | 8/2009 |

* cited by examiner

SYSTEM FOR READING PRESSURE OF A PRESSURE SENSOR AND METHOD THEREFOR

TECHNICAL FIELD

Embodiments of the subject matter described herein relate generally to pressure sensors and methods for measuring pressure with pressure sensors.

BACKGROUND

Pressure sensor devices find application in a wide variety of applications and systems. In particular, pressure sensors may be exposed to various environments that may affect their accuracy. Accordingly, there is a need for pressure sensors and methods for measuring pressure with increased accuracy.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

SUMMARY

Figure 1B:
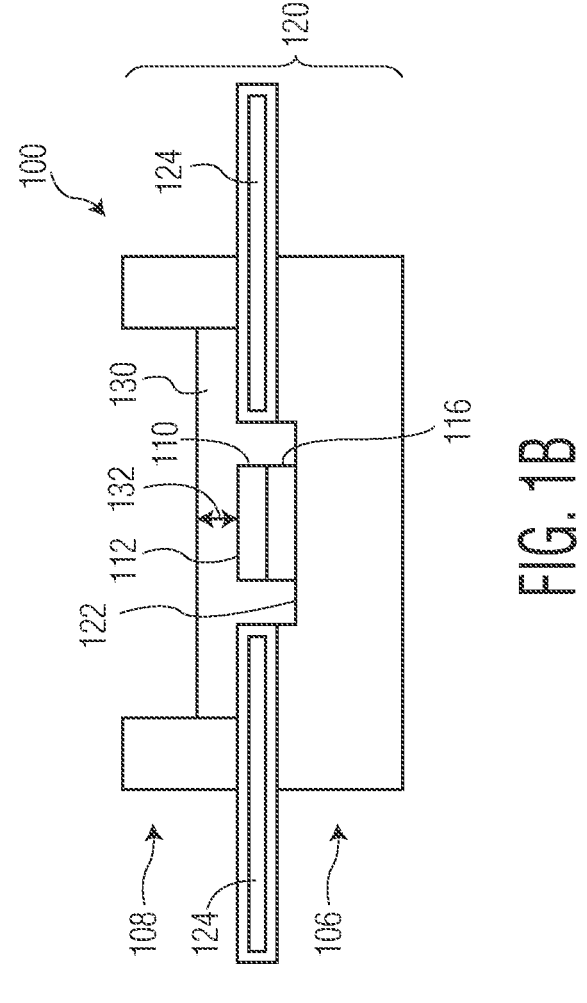
FIGS. 1A and 1B are cross-sectional, side views of an exemplary pressure sensor.

In one aspect, an embodiment may include a method for reading pressure of a pressure sensor that is configured to read a pressure. The method may include reading, by a first device coupled to the pressure sensor subjected to an acceleration, a measured acceleration of the pressure sensor, wherein the pressure sensor may include a sensing element encapsulated in a medium, according to an embodiment, and wherein the acceleration may alter a measured pressure of the pressure sensor, according to an embodiment. The method may include reading, by a second device, a measured pressure from the pressure sensor, according to an embodiment. The method may also include adjusting the measured pressure of the pressure sensor based on the measured acceleration to produce an adjusted pressure reading, according to an embodiment. The method may include outputting, by an output device, an output pressure reading.

In an embodiment, adjusting the measured pressure of the pressure sensor based on the measured acceleration to produce an adjusted pressure reading may occur if an output criteria is met.

In an embodiment, the first device may include one of a wheel speed sensor, an engine control unit, a braking control system, an engine control system, a stability control system, and an airbag control system.

In an embodiment, the pressure sensor may be included in a tire pressure monitoring system.

In an embodiment, the first device may include an accelerometer.

In an embodiment, reading the acceleration of the pressure sensor may include measuring and calibrating the acceleration of the pressure sensor.

In an embodiment, measuring and calibrating the acceleration of the pressure sensor may include storing the acceleration in a memory device.

In an embodiment, adjusting the measured pressure of the pressure sensor may be based on a height of the medium above a sensing element of the pressure sensor (h), a density of the medium (ρ), and the acceleration of the pressure sensor (a), and an angle of the acceleration with respect to a normal direction above the sensing element of the pressure sensor (θ).

In an embodiment, adjusting the measured pressure of the pressure sensor may be estimated by a correction factor of $\rho*a*h*\cos(\theta)$.

In an embodiment, the output criteria may include whether an enable signal is present, and wherein if the output criteria is met, the output pressure reading includes the adjusted pressure reading, and wherein the output pressure reading includes an unadjusted pressure reading if the output criteria is not met.

In an embodiment, the output criteria may include whether a most recent measured acceleration of a pre-determined number of measured accelerations is within a required range of acceleration values, and wherein the output pressure reading includes the adjusted pressure reading, and wherein the output pressure includes an unadjusted pressure if the output criteria is not met.

In an embodiment, reading the acceleration of the pressure sensor may include reading the acceleration of the pressure sensor includes, triggering the reading of the pressure sensor when an acceleration reading criteria is met, wherein the acceleration reading criteria includes whether reading a pre-determined number of acceleration readings of the pressure sensor.

In another aspect, an embodiment may include a pressure sensor encapsulated in a medium. A first device may be coupled to the pressure sensor and configured to read an acceleration of the pressure sensor, wherein the acceleration may alter a measured pressure from the pressure sensor, according to an embodiment. A second device may be configured to read a pressure from the pressure sensor wherein, if an output criteria is met, to adjust the measured pressure of the pressure sensor, based on a measured acceleration, to produce an adjusted pressure reading, according to an embodiment. In an embodiment, an output device configured to receive an output of the second device and configured to output an output pressure reading.

The first device may include a wheel speed sensor, an engine control unit, a braking control system, an engine control system, a stability control system, and an airbag control system, according to an embodiment.

The first device may include an accelerometer, according to an embodiment.

The pressure sensor is included in a tire pressure monitoring system, according to an embodiment.

In an embodiment, the second device may be selected from the group consisting of a micro-controller, a micro-processor, and a state machine.

The second device may be configured to adjust the measured pressure of the pressure sensor based on a height of the medium above a sensing element of the pressure sensor (h), a density of the medium (ρ), and the acceleration of the pressure sensor (a), and an angle of the acceleration with respect to a normal component above the sensing element of the pressure sensor ($\theta$), according to an embodiment.

In an embodiment, the second device may adjust the pressure reading of the pressure sensor by an estimate given by $\rho*a*h*\cos(\theta)$.

The output device may be selected from a radio-frequency transmitter and a wired connection, according to an embodiment.

DETAILED DESCRIPTION

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary, or an example is not necessarily to be construed as preferred or advantageous over other implementations. Furthermore, there is no intention to be bound by any expressed or implied theory presented in the preceding technical field, background, or the following detailed description.

Figure 1A:
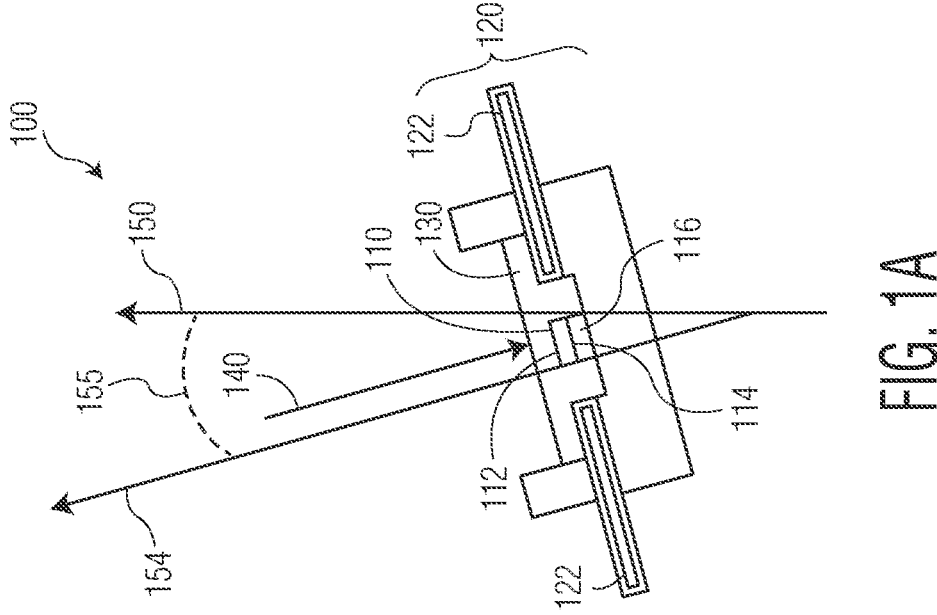

FIGS. 1A and 1B, referred to collectively as FIG. 1, are a cross-sectional, side views of a pressure sensor 100, according to an embodiment. In an embodiment, the pressure sensor 100 may include a membrane 110 (i.e., "sensing element") having an upper surface 112 and lower surface 114 mounted onto a package flange 120. The membrane 110 may modulate an electrical signal through a change in resistance or capacitance when subjected to mechanical forces, according to an embodiment. A bonding layer 116 may be used to attach the membrane 110 to the package flange 120, according to an embodiment. In an embodiment, the membrane 110 may be bonded to the package flange 120 within recessed opening 122 within the package flange 120 using bonding layer 116. A gel layer 130 (i.e., "material") may encapsulate the membrane 110 within the package flange 120, according to an embodiment.

In an embodiment, a lower portion 106 of the pressure sensor 100 may be sealed from the environment the upper portion 108 pressure sensor 100 is exposed to. The differential in pressure between the ambient environment and the sealed portion may cause pressure force 140 to be exerted against the membrane, changing the current of an electrical voltage applied to the membrane, according to an embodiment. In an embodiment, pre-processing circuitry (depicted as sensors pre-processing circuitry 370 in FIG. 3) may be electrically coupled to the membrane 110 through leads 124 to measure and amplify the electrical modulated by the pressure sensor 100. For example, the pressure sensor 100 may be mounted in a tire pressure monitoring system (TPMS) module wherein the lower portion 106 is mounted to a portion of the TPMS module and sealed from the pressure environment, according to an embodiment.

In many applications, e.g., TPMS applications, the membrane 110 of the pressure sensor 100 may be subject to an acceleration force 150, according to an embodiment. The acceleration force 150 may act as an additional "pressure" that alters the electrical signal modulated by the membrane 110 in response to the pressure force 140. Because the membrane 110 has the greatest sensitivity to forces normal (i.e., 90 degrees) to the upper surface 112 of the membrane 110, a normal force component 154 may be used to characterize the sensitivity of a pressure reading of the pressure sensor 100, according to an embodiment. In an embodiment, a magnitude of normal force component 154 may be calculated using the relationship $a*\cos(\theta)$ where a is the magnitude of acceleration force 150 and $\theta$ is the angle 155 given in radians between the acceleration force 150 and the normal force component 154. The normal force component may be combined with the product of the density of the gel layer, $\rho$ and a height 132, h, of the gel layer above the upper surface 112 of membrane 110, to produce an estimate of the effective pressure exerted on membrane 110 by acceleration force 150 given by the $P_{uff}\rho*a*h*\cos(\theta)$. In an embodiment, the density of the gel layer, p may be between about 1.5 grams per cubic centimeter ($g/cm^3$) and about 2.5 $g/cm^3$, though higher or lower values may be used in other applications. In other embodiments, the density of the gel layer, p may be between about 0.5 $g/cm^3$ and about 5 $g/cm^3$, though higher or lower values may be used in other applications. The height 132, h, may be between about 100 micrometers and about 300 micrometers, though other higher or lower values may be used in other applications and within the scope of the inventive subject matter. In an embodiment, the reading of a pressure reading by the pressure sensor 100 may be corrected by the effective pressure, based on the relationship by $P_{eff}$.

Figure 2:
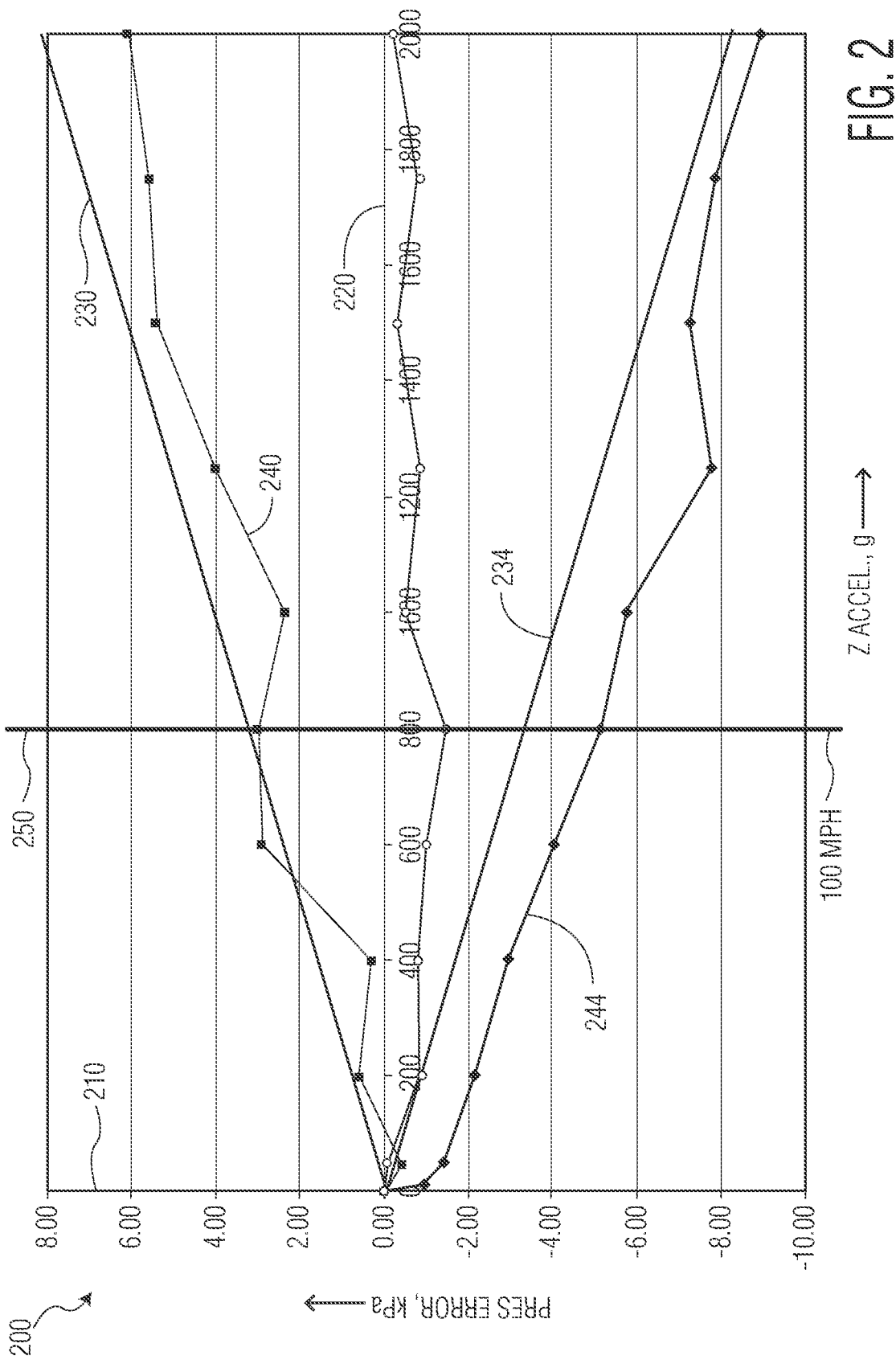
FIG. 2 is a graphical representation of pressure in kilopascals versus acceleration in standard gravity units.

FIG. 2 is a graphical representation 200 of pressure in kilopascals versus the magnitude of a magnitude of normal force component 154 in standard gravity unis, according to an embodiment. FIG. 2, depicts an ordinate 210 of pressure in kilopascals versus an abscissa 220 of standard gravity units, g where 1 g is defined at approximately 9.8065 meters per second squared ($m/s^2$). Traces 230 and 234 represent the calculation of $P_{eff}$ described in connection with FIG. 1. Traces 240 and 244 represent the measurements of actual pressure measured in a pressure sensor 100 that is subjected to various acceleration levels in the context of a TPMS module. In this example, the values of p and h are 1.825 $g/cm^3$ and 230 micrometers, respectively. Comparison of traces 230 and 234 to traces 240 and 244 show an example of the correlation between measurements and estimates of $P_{eff}$ using the relationship $P_{eff}=\rho*a*h*\cos(\theta)$ described in connection with FIG. 1. In FIG. 2, traces 234 and 244 represent operation of the upper surface 112 of membrane 110 facing away from the center of rotation ($\theta=180$ degrees). Furthermore traces 230 and 240 represent operation with the upper surface 112 of membrane 110 facing the center of rotation the center of rotation ($\theta=0$ degrees). At an example point 250, the error in pressure due to acceleration force at a 100 mile-per-hour wheel speed is shown.

Figure 3:
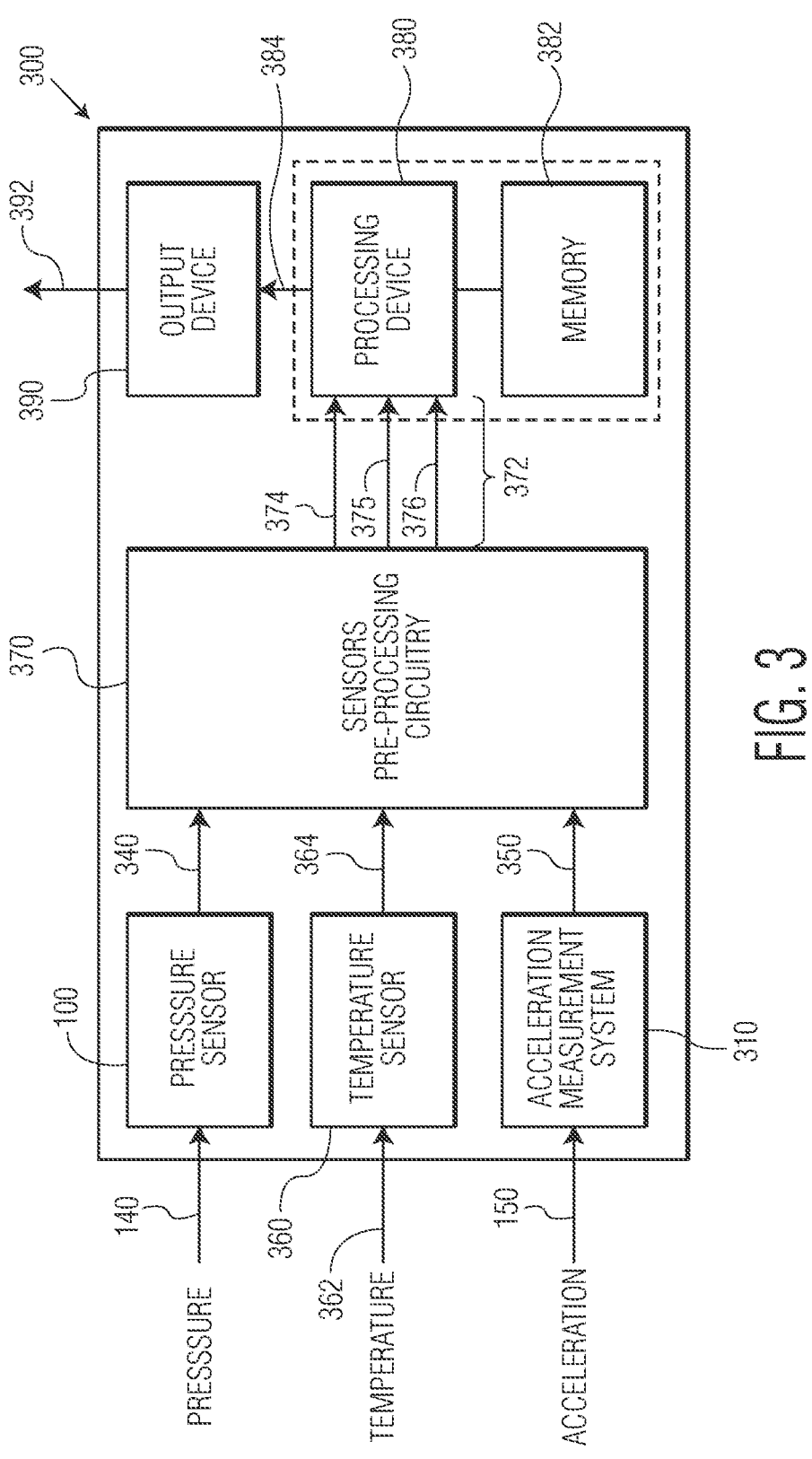
FIG. 3 is a block diagram of a system for measuring pressure from a pressure sensor, according to an embodiment.

FIG. 3 is a block diagram of a system 300 for measuring pressure from a pressure sensor, according to an embodiment. In an embodiment, the system 300 may include a pressure sensor 100 configured to read a pressure force 140, an acceleration measurement system 310 (i.e., "first device") coupled to the pressure sensor 100 and may be configured to read an acceleration force 150 of the pressure sensor 100 and produce a measured acceleration 350, wherein the measured acceleration 350 may be used to adjust a measured pressure 340 at a processing device 380. As used herein, the term "measured acceleration" means an acceleration that may be measured directly or indirectly or estimated. For example, in some embodiments, measured acceleration may be determined by a direct measurement using, e.g., an accelerometer or other system configured to measure acceleration directly. In other embodiments, acceleration may be measured indirectly, e.g., by estimating acceleration from calculations based on a wheel speed, e.g., from a wheel speed sensor, an engine control unit, or other device that may be used to estimate the acceleration of the pressure sensor 100. In some embodiments, a temperature sensor 360 may be configured to measure a temperature 362 and output a measured temperature 364 may be coupled to the pressure sensor 100. According to an embodiment, sensors pre-processing circuitry 370 may be used to amplify measured pressure 340. In other embodiments, sensor pre-processing circuitry 370 may amplify measured one or more of measured acceleration 350 and measured temperature 364. A pre-processed output 372 may be fed to a processing device 380 (i.e., "second device"). In some embodiments, pre-processed output 372 may include pre-processed pressure output 374, pre-processed temperature output 375, and pre-processed acceleration output 376, according to an embodiment. In an embodiment, pre-processed output 372 may include a signal bus that includes pre-processed output 372 may include pre-processed pressure output 374, pre-processed temperature output 375, and pre-processed acceleration output 376. Processing device 380 may be coupled to a memory device 382. Processing device 380 may be configured to read a measured pressure 340 from the pressure sensor 100. Processing device 380 may be further configured to adjust the measured pressure 340 of the pressure sensor if a pressure measurement output criteria (i.e., "output criteria") is met based on the measured acceleration 350, to produce an adjusted pressure reading 384, according to an embodiment. In an embodiment, an output device 390 may be configured to receive an output of the second device and may be configured to output an output pressure reading 392.

Acceleration measurement system 310 may include a system for measuring an acceleration applied to pressure sensor 100, according to an embodiment. In an embodiment, the acceleration measurement system 310 may include an accelerometer (e.g., a micro-electro-mechanical system (MEMs)-based inertial sensor). In these embodiments, the accelerometer may be incorporated into a tire pressure monitoring system. In other embodiments the accelerometer may be located separately from the pressure sensor. In other embodiments in automotive applications, the acceleration measurement system 310 may include one or more of an engine control unit, a braking control system, an engine control system, a stability control system, and an airbag control system (not shown). In these embodiments, estimates of the acceleration force 150 may be obtained by calculating the acceleration force 150 of pressure sensor 100 in the context of a rotating environment, e.g., a tire pressure monitoring system or other application where the pressure sensor may rotate at a wheel speed, the acceleration force 150 may be computed using the relationship $a=v^2/r$ where $v$ is the tangential velocity of the wheel and $r$ is the radius of the location of the pressure sensor 100 in relationship to the center of the wheel. In other embodiments, e.g., industrial machinery, engines, wherein the pressure sensor 100 may be located in a rotating environment, acceleration of the pressure sensor 100 may be determined similarly. For example, in an automotive application, engine revolutions per minute (RPM's) may be determined from an ECU and used with the gear ratio and wheel dimension, obtained from the ECU, body controller, or elsewhere to determine the wheel speed from which the acceleration force 150 may be estimated. In another example, wheel speed may be determined from a speedometer in a vehicle and used with the wheel dimension, obtained from the ECU, body controller, or elsewhere to estimate the acceleration force 150.

Temperature sensor 360 may output measured temperature 364, according to an embodiment. Output measured temperature 364 may serve as an input to sensors pre-processing circuitry 370, according to an embodiment. In an embodiment, measured temperature 364 may be used by processing device 380 to estimate changes in one or more properties of membrane 110, package flange 120, and/or gel layer 130 which may then be used to further correct estimates of the pressure force 140. In an embodiment, the one or more properties may include stiffness of the membrane 110, stiffness of the gel layer 130, density of the gel layer 130, temperature-dependent stress of membrane 110, temperature-dependent stress of package flange 120, and any other temperature dependencies in the system, without limitation. In an embodiment, the output of temperature sensor 360 may be used to calibrate the measured acceleration 350. In an embodiment, processing device 380 may be used to calibrate the measured acceleration 350.

Sensors pre-processing circuitry 370 may include circuitry for receiving measured pressure 340, measured acceleration 350, measured temperature 364, and then amplifying and conditioning these signals into pre-processed output 372 that may be read by processing device 380, according to an embodiment. In an embodiment, sensors pre-processing circuit 370 may include amplifier circuitry. Pre-processed output 372 may include 4, pre-processed pressure output 374, pre-processed temperature output 375, and pre-processed acceleration output 376, according to an embodiment. In some embodiments, sensor pre-processing circuitry 370 may also include analog-to-digital converter circuitry such that pre-processed output 372 includes a digital signal that may be processed by processing device 380. In other embodiments, pre-processed output 372 includes an analog signal.

In an embodiment, processing device 380 may be coupled to sensors pre-processing circuitry 370 and receives pre-processed output 372. As used herein, the term, "processing device" means any device or means that may be used to process or respond to pre-processed output 372. In an embodiment, processing device 380 may include one or more of a microprocessor, a state machine, a micro-controller, an application-specific integrated circuit (ASIC), general-purpose computer, computing device, or other suitable device without limitation. In an embodiment, processing device 380 may be coupled to a memory device 382. In an embodiment, processing device 380 may be configured to adjust the measured pressure 340 of the pressure sensor 100 based on a height 132 of the gel layer 130 above the membrane 110 (i.e., "sensing element") of the pressure sensor, the density of the medium, and the acceleration of the pressure sensor, and the angle 155 of the acceleration with respect to a normal component above the sensing element of the pressure sensor ($\theta$). In an embodiment, the memory device 382 of the output device 390 may store the parameters $\rho$, a, h, $\theta$ and adjust the pressure reading 340 of the pressure sensor by an estimate given by $P_{eff}=\rho*a*h*\cos(\theta)$. The estimate $P_{eff}$ may then be used to correct the measured pressure 340 to arrive at adjusted pressure reading 384, according to an embodiment.

Output device 390 may be coupled to the output device 390 and may receive adjusted pressure reading 384, according to an embodiment. In an embodiment, output device 390 may include one or more of a radio frequency (RF) transmitter, a wired connection, or other suitable means for producing an output pressure reading 392, according to an embodiment.

Figure 4:
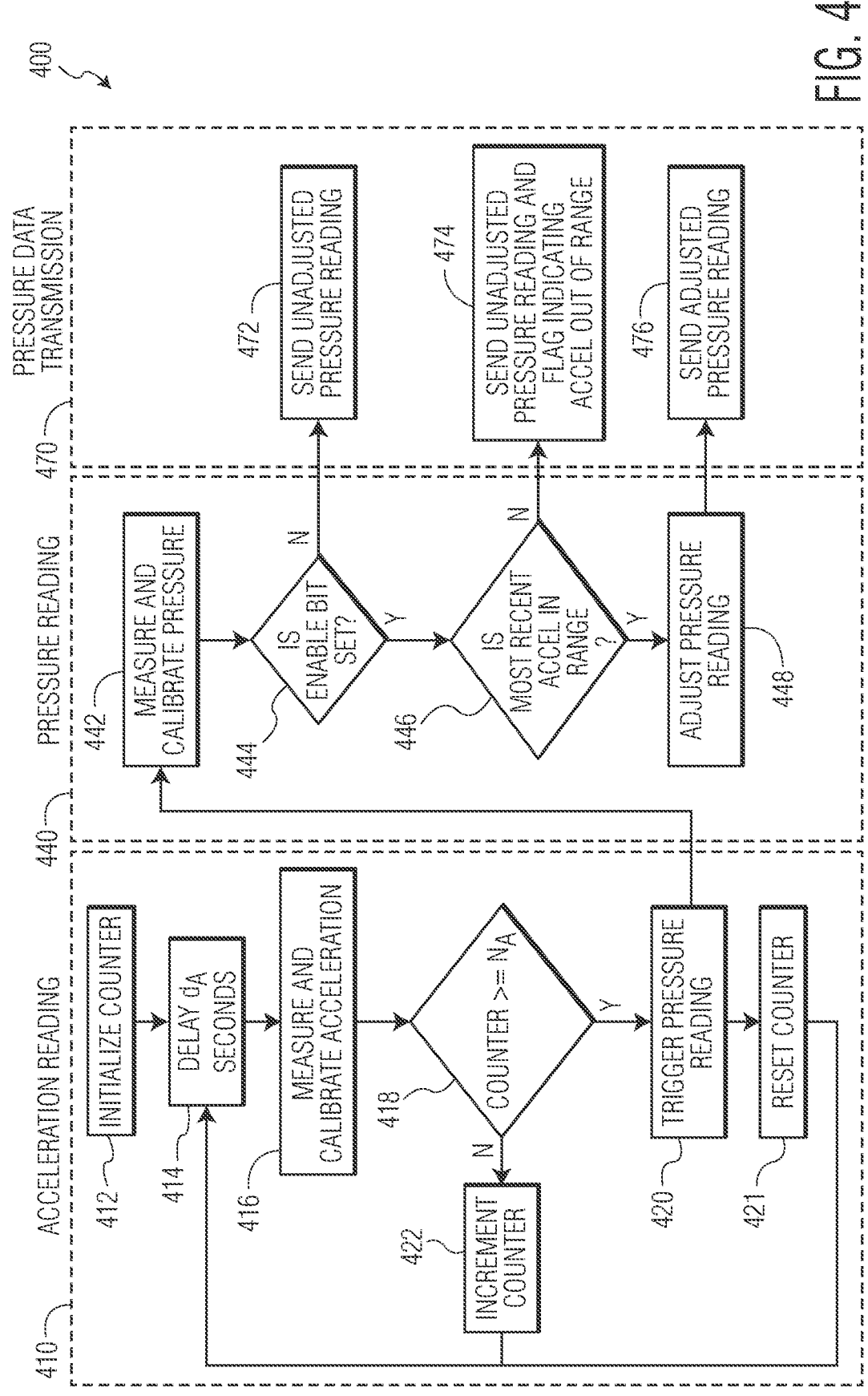
FIG. 4 is a flow diagram for a method for measuring pressure of a pressure sensor, according to an embodiment.

FIG. 4 is a flow diagram for a method 400 for measuring pressure of pressure sensor 100, according to an embodiment. FIG. 4 is best understood by viewing it together with FIG. 3, described previously.

Referring simultaneously to FIG. 4, block 410 and FIG. 3, in an embodiment, the method may include reading, by the acceleration measurement system 310 of FIG. 3 (i.e., "first device"), the acceleration 150 of pressure sensor 110. In an embodiment, the acceleration force 150 may alter a reading of the pressure sensor 100 due to the acceleration force 150, according to an embodiment.

Referring simultaneously to FIG. 4, block 410 and sub-blocks 412-418, an embodiment of the method may include reading the acceleration of the pressure sensor 100 that may include, triggering the reading of the pressure sensor when an acceleration reading criteria is met, wherein the acceleration reading criteria includes whether reading a pre-determined number of acceleration readings of the pressure sensor. Referring to sub-block 412, in an embodiment, determining whether the acceleration reading criteria is met may include setting a counter to zero and setting a fixed number of acceleration measurements, $N_A$. After setting the counter to zero, in sub-block 414, a delay may be taken before measuring and calibrating acceleration in sub-block 416, according to an embodiment. In decision sub-block 418, it may be determined whether the fixed number of acceleration measurements, $N_A$, has been met, according to an embodiment. In an embodiment, if the fixed number of acceleration measurements, $N_A$, have been met, the pressure reading may be triggered in sub-block 420 and the counter may be reset in sub-block 421. However, if the fixed number of acceleration measurements, $N_A$, has not been met, the counter may be incremented in sub-block 422.

Referring simultaneously to FIG. 4, blocks 440 and 470 and FIG. 3, an embodiment of the method 400 may include reading, by the sensors pre-processing circuitry 370 and processing device 380 (i.e. "second device"), the measured pressure 340 from the pressure sensor 100 wherein, if a pressure measurement output criteria (i.e., "output criteria") is met, adjusting, the measured pressure 340 of the pressure sensor 100 based on the measured acceleration 350 to produce an adjusted pressure reading 384. In sub-block 442, in an embodiment of the method, the pressure may be read according to an embodiment. In decision sub-blocks 444, 446 and according to an embodiment of the method, the pressure measurement output criteria may include testing whether an enable signal is present, and wherein if the enable signal is present in decision sub-block 444 and if the most recent reading of measured acceleration 350 is in a specified range of acceleration values in decision sub-block 446, the pressure reading is adjusted in sub-block 448 and the output pressure reading includes the adjusted pressure reading in sub-block 476. However, if the enable bit is not set in decision sub-block 444, and, according to sub-block 472, the pressure reading 384 includes an unadjusted pressure reading, according to an embodiment. Further, and in an embodiment, if the enable bit is set in decision sub-block 444 and the most recent reading of measured acceleration 350 is out of the specified range in decision sub-block 446, the pressure reading 384 includes an unadjusted pressure reading in addition to a flag indicating that acceleration is out of range according to sub-block 474. The method 400 may include outputting, by output device 390, an output pressure reading 392, according to an embodiment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

For the sake of brevity, conventional semiconductor fabrication techniques may not be described in detail herein. In addition, certain terminology may also be used herein for reference only, and thus are not intended to be limiting, and the terms "first", "second" and other such numerical terms referring to structures do not imply a sequence or order unless clearly indicated by the context.

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

What is claimed is:

1. A method for reading pressure of a pressure sensor, the method comprising:
   reading, by a first device coupled to a pressure sensor subjected to an acceleration, a measured acceleration of the pressure sensor, wherein the pressure sensor includes a sensing element encapsulated in a medium, and wherein the acceleration alters a measured pressure of the pressure sensor;
   reading, by a second device, a measured pressure from the pressure sensor, wherein reading the measured pressure of the pressure sensor includes triggering the reading of the pressure sensor when an acceleration reading criteria is met, and wherein the acceleration reading criteria includes whether reading a pre-determined plurality of acceleration readings of the pressure sensor have occurred;
   adjusting the measured pressure of the pressure sensor based on the measured acceleration to produce an adjusted pressure reading, wherein adjusting the measured pressure of the pressure sensor based on the measured acceleration to produce an adjusted pressure reading only occurs if an output criteria is met; and
   outputting, by an output device, an output pressure reading.

2. The method of claim 1, wherein the first device is selected from the group consisting of a wheel speed sensor, an engine control unit, a braking control system, an engine control system, a stability control system, and an airbag control system.

3. The method of claim 1, wherein the pressure sensor is included in a tire pressure monitoring system.

4. The method of claim 1, wherein the first device includes an accelerometer.

5. The method of claim 1, wherein reading the acceleration of the pressure sensor includes measuring and calibrating the acceleration of the pressure sensor.

6. The method of claim 5, wherein measuring and calibrating the acceleration of the pressure sensor includes storing the acceleration in a memory device.

7. The method of claim 6, wherein adjusting the measured pressure of the pressure sensor is based on a height of the medium above a sensing element of the pressure sensor (h), a density of the medium (ρ), and the acceleration of the pressure sensor (a), and an angle of the acceleration with respect to a normal direction above the sensing element of the pressure sensor (θ).

8. The method of claim 7, wherein adjusting the measured pressure of the pressure sensor is estimated by a correction factor of $\rho*a*h*\cos(\theta)$.

9. The method of claim 1, wherein the output criteria comprises whether an enable signal is present, and wherein if the output criteria is met, the output pressure reading includes the adjusted pressure reading, and wherein the output pressure reading includes an unadjusted pressure reading if the output criteria is not met.

10. The method of claim 9, wherein the output criteria further comprises whether a most recent measured acceleration of a pre-determined number of measured accelerations is within a required range of acceleration values, and wherein the output pressure reading includes the adjusted pressure reading if the output criteria is met, and wherein output pressure includes an unadjusted pressure if the output criteria is not met.

11. A system comprising:

a pressure sensor encapsulated in a medium:

an acceleration measurement system coupled to the pressure sensor and configured to read an acceleration of the pressure sensor, wherein the acceleration alters a measured pressure from the pressure sensor;

a processing device configured to read a pressure from the pressure sensor and adjust the measured pressure of the pressure sensor, based on a measured acceleration, to produce an adjusted pressure reading, wherein the processing device is configured to trigger the reading of the pressure sensor when an acceleration reading criteria is met, and wherein the acceleration reading criteria includes whether reading a pre-determined plurality of acceleration readings of the pressure sensor have occurred; and an output device configured to receive an output of the second device and configured to output an output pressure reading.

12. The system of claim 11, wherein the first device is selected from the group consisting of an engine control unit, a braking control system, an engine control system, a stability control system, and an airbag control system.

13. The system of claim 12, wherein the first device includes an accelerometer.

14. The system of claim 11, wherein the pressure sensor is included in a tire pressure monitoring system.

15. The system of claim 11, wherein the second device is selected from the group consisting of a micro-controller, a microprocessor, and a state machine.

16. The system of claim 11, wherein the second device is configured to adjust the measured pressure of the pressure sensor based on a height of the medium above a sensing element of the pressure sensor (h), a density of the medium (ρ), and the acceleration of the pressure sensor (a), and an angle of the acceleration with respect to a normal component above the sensing element of the pressure sensor (θ).

17. The system of claim 16, wherein the second device adjusts the pressure reading of the pressure sensor by an estimate given by $\rho*a*h*\cos(0)$.

18. The system of claim 11, wherein the output device is selected from the group consisting of a radio-frequency transmitter and a wired connection.

19. The system of claim 11, wherein the output criteria comprises whether an enable signal is present, and wherein if the output criteria is met, the output pressure reading includes the adjusted pressure reading, and wherein the output pressure reading includes an unadjusted pressure reading if the output criteria is not met.

20. The system of claim 19, wherein the output criteria further comprises whether a most recent measured acceleration of a pre-determined plurality of measured accelerations is within a required range of acceleration values, and wherein the output pressure reading includes the adjusted pressure reading if the output criteria is met, and wherein the output pressure reading includes the unadjusted pressure if the output criteria is not met.

* * * * *